(12) United States Patent
Jang et al.

(10) Patent No.: US 7,797,079 B2
(45) Date of Patent: Sep. 14, 2010

(54) APPARATUS FOR CONTROLLING ROBOT AND METHOD THEREOF

(75) Inventors: Min Su Jang, Daejeon (KR); Joo Chan Sohn, Daejeon (KR); Young Cheol Go, Daejeon (KR); Sang Seung Kang, Daejeon (KR); Young Jo Cho, Seongnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 987 days.

(21) Appl. No.: 11/591,275

(22) Filed: Nov. 1, 2006

(65) Prior Publication Data

US 2007/0150098 A1    Jun. 28, 2007

(30) Foreign Application Priority Data

Dec. 9, 2005    (KR) ...................... 10-2005-0121046
Jun. 28, 2006    (KR) ...................... 10-2006-0058892

(51) Int. Cl.
G06F 19/00    (2006.01)
(52) U.S. Cl. ...................................... 700/245
(58) Field of Classification Search ................ 700/245, 700/246, 253, 257
See application file for complete search history.

(56) References Cited

U.S. PATENT DOCUMENTS

2004/0243281 A1    12/2004    Fujita et al.
2005/0282561 A1*   12/2005    Wu ........................ 455/456.6

FOREIGN PATENT DOCUMENTS

| JP | 2002-205291 | 7/2002 |
| KR | 2002-0026165 | 4/2002 |
| KR | 1020040011010 | 2/2004 |
| KR | 10-2004-0098498 | 11/2004 |
| KR | 1020040098498 | 11/2004 |
| KR | 1020060021946 | 3/2006 |
| KR | 1020060039304 | 5/2006 |

OTHER PUBLICATIONS

"A Proactive Service Platform for URC." Minsu Jang et al. The 2nd International Conference on Ubiquitous Robots and Ambient Intelligence. Nov. 2-4, 2005. Daejeon, Korea. pp. 23-26.

* cited by examiner

Primary Examiner—Kim T Nguyen
(74) Attorney, Agent, or Firm—Ladas & Parry LLP

(57) ABSTRACT

An apparatus for controlling a robot and a method thereof are provided. The apparatus includes: a state interpretation unit determining whether or not a current situation belongs to a preset unstable state by evaluating the current situation based on a plurality of perception information items; and a target generation unit setting a target action of the robot by comparing the current situation and the determination result with a predetermined value system, and then, modifying the target action by receiving a feedback of the action performance result of the robot as perception information. According to the method and apparatus, by inputting a processing procedure and a value system to solve a variety of unstable states that can occur in situations of a user and circumstances surrounding the robot, the robot can actively respond with actions.

9 Claims, 5 Drawing Sheets

APPARATUS FOR CONTROLLING ROBOT AND METHOD THEREOF

CROSS-REFERENCE TO RELATED PATENT APPLICATIONS

This application claims the benefit of Korean Patent Application No. 10-2005-0121046, filed on Dec. 9, 2005, and No. 10-2006-0058892, filed on Jun. 28, 2006 in the Korean Intellectual Property Office, the disclosures of which are incorporated herein in their entirety by reference.

BACKGROUND OF THE INVENTION

1. Field of the Invention

The present invention relates to an apparatus for controlling a robot and a method thereof, and more particularly, to an apparatus enabling a robot to actively respond with actions to solve a variety of unstable states that can occur in situations and circumstances occurring to the robot, and a method thereof.

2. Description of the Related Art

Active control technology is the conventional technology that deals with the art of the present invention. Active control technology is based on desires and emotions, and active control technology is employed by robots of the pet robot group represented by AIBO of the Japanese company, SONY.

In AIBO, a method of drawing an action with internal and external stimuli, such as hunger and scolding, as motives, is embedded. According to this method, AIBO receives inputs from a plurality of perception evaluation items and motive states, and by repeatedly applying a variety of arithmetic expressions and matrix operations that can calculate correlations between each element forming the inputs, AIBO actively draws a behavioral expression. An example of such a drawn behavioral expression is a behavioral expression from an instinctive desire as illustrated by expression 1:

$$\begin{bmatrix} \text{Exploration} \\ \text{Teasing} \\ \text{Resting} \end{bmatrix} = \begin{bmatrix} -10 & 10 & 0 \\ 0 & 0 & 15 \\ 10 & -5 & 0 \end{bmatrix} \begin{bmatrix} \text{Fatigue} \\ \text{Curiosity} \\ \text{Affection} \end{bmatrix}. \quad (1)$$

According to expression 1, if fatigue is high and curiosity is low, a resting behavior is active. Fatigue, curiosity and the like are based on a desire and emotion model of the robot and are continuously calculated by gathering external stimuli values sensed from a variety of sensors arranged on the robot, and which are input to the action selection arithmetic expressions. In this manner, the robot actively expresses a series of actions.

However, the active action expression method based on desire and emotion, as described above, may be useful in order to draw an instinctive action, but it is difficult for the method to be used in order to draw actions that have a high-level of intention. In this case, the actions that have a high-level of intention include the following actions.

First, the actions include an action involving a user. That is, a robot should be able to draw an action, i.e., a service that can improve comfort, and provide pleasure and enjoyment to the user. For example, when the interpreted result of a current situation indicates that the user is in a living room, wherein the temperature is high and the humidity is low and causing the user to feel uncomfortable, the robot should generate an objective to make the living room surroundings pleasant for the user and should be able to provide a suitable service based on that objective.

Secondly, the robot should be able to determine whether or not an unstable situation has occurred by continuously monitoring and interpreting changes in the surrounding, and draw a objective-oriented action that can solve the occurred unstable situation. For example, if the robot senses a situation where the temperature of a certain area is continuously rising at midnight, the robot should determine that an emergency situation has occurred, and in order to solve the problem, the robot should be able to alert the user or further examine the area where the emergency situation has occurred.

SUMMARY OF THE INVENTION

The present invention provides an apparatus and method capable of providing an internal knowledge processing mechanism enabling a robot to actively draw actions that have a high-level of intention.

According to an aspect of the present invention, there is provided an apparatus for controlling a robot including: a state interpretation unit determining whether or not a current situation belongs to a preset unstable state by evaluating the current situation based on a plurality of perception information items input externally; and a target generation unit setting a target action of the robot by comparing the current situation and the determination result with a predetermined value system, and then, modifying the target action by receiving a feedback of the action performance result of the robot as perception information.

According to another aspect of the present invention, there is provided a method of controlling a robot including: establishing a plurality of obligations that a robot must perform; determining whether or not a current situation belongs to a preset unstable state by evaluating the current situation based on a plurality of perception information items input externally; setting a target action of the robot by comparing the current situation with the determination result with the obligations, and then, ordering the performance of the target action; and modifying the target action by receiving a feedback of the action performance result of the robot as perception information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
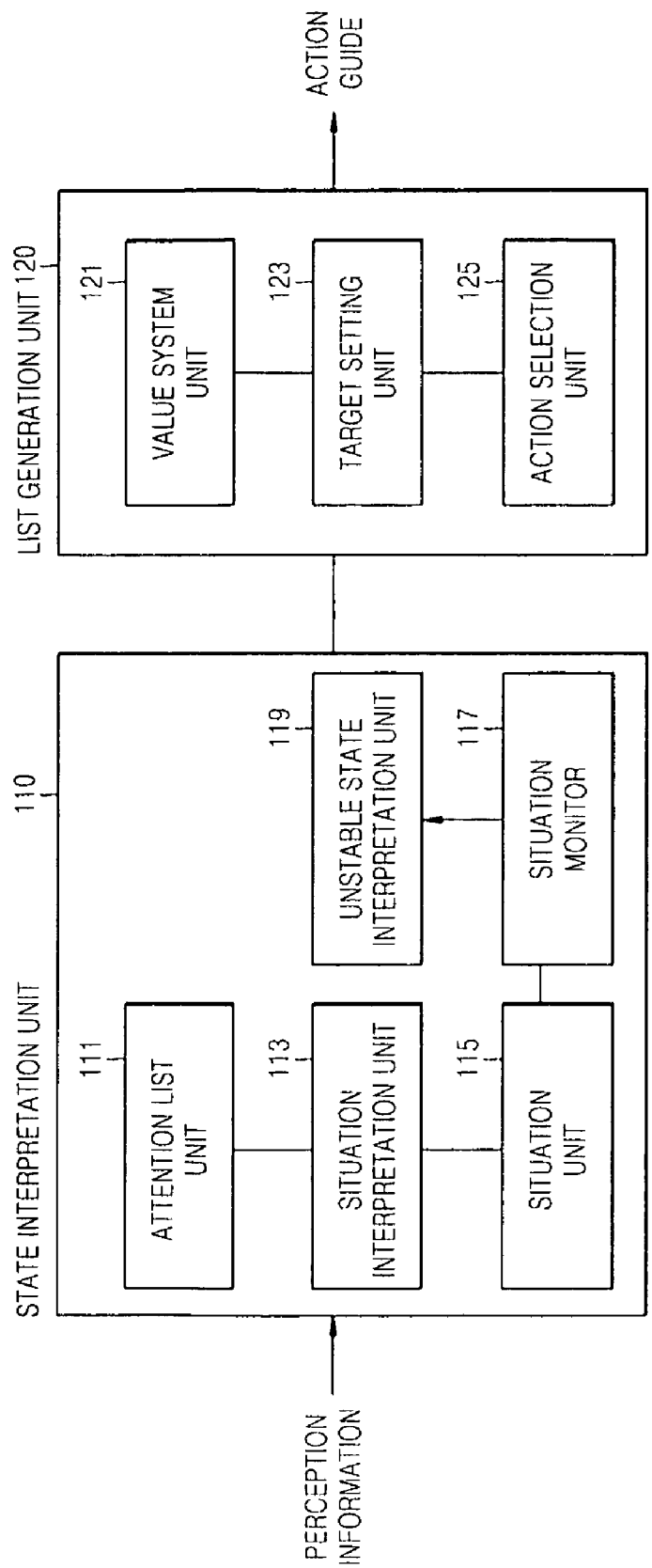
FIG. 1 is a block diagram illustrating a structure of an apparatus for controlling a robot according to an embodiment of the present invention.
Figure 2:
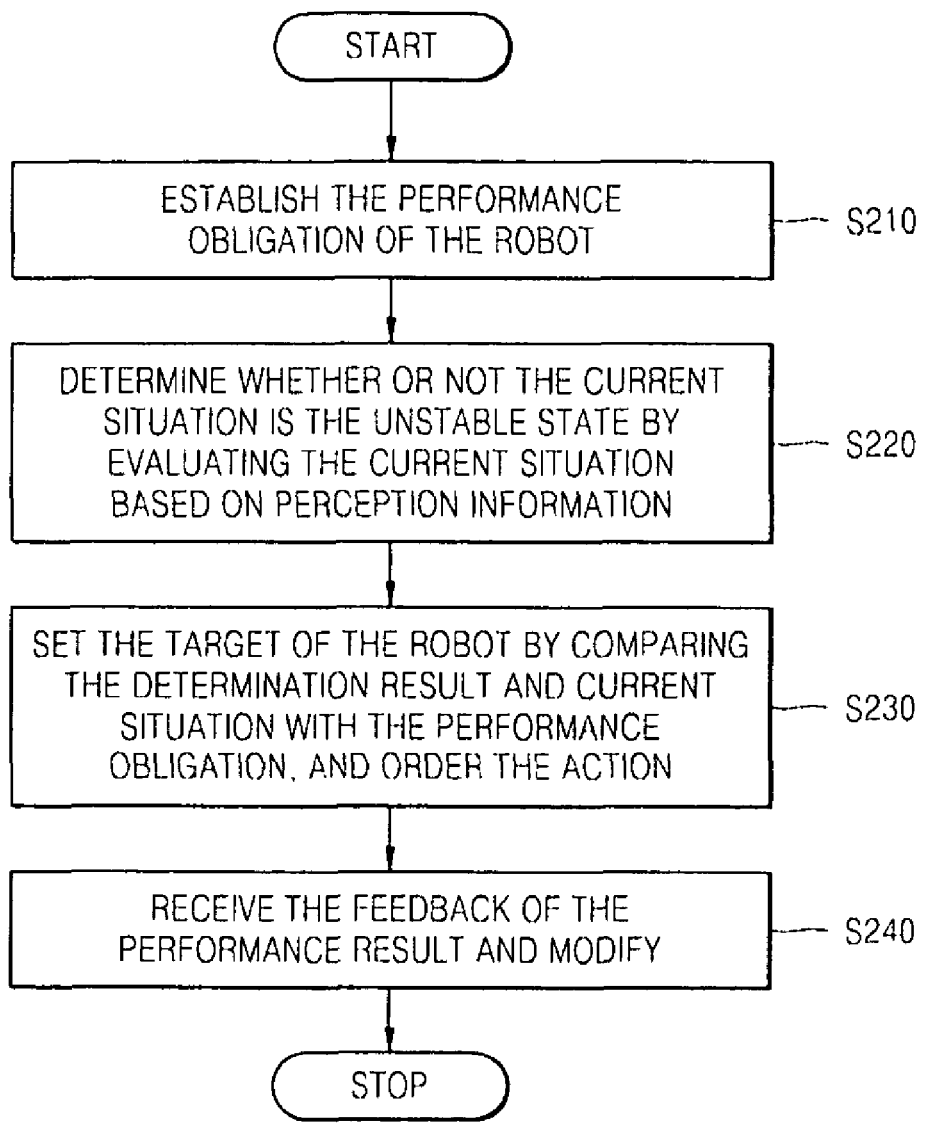
FIG. 2 is a flowchart illustrating a method of controlling a robot according to an embodiment of the present invention.
Figure 3:
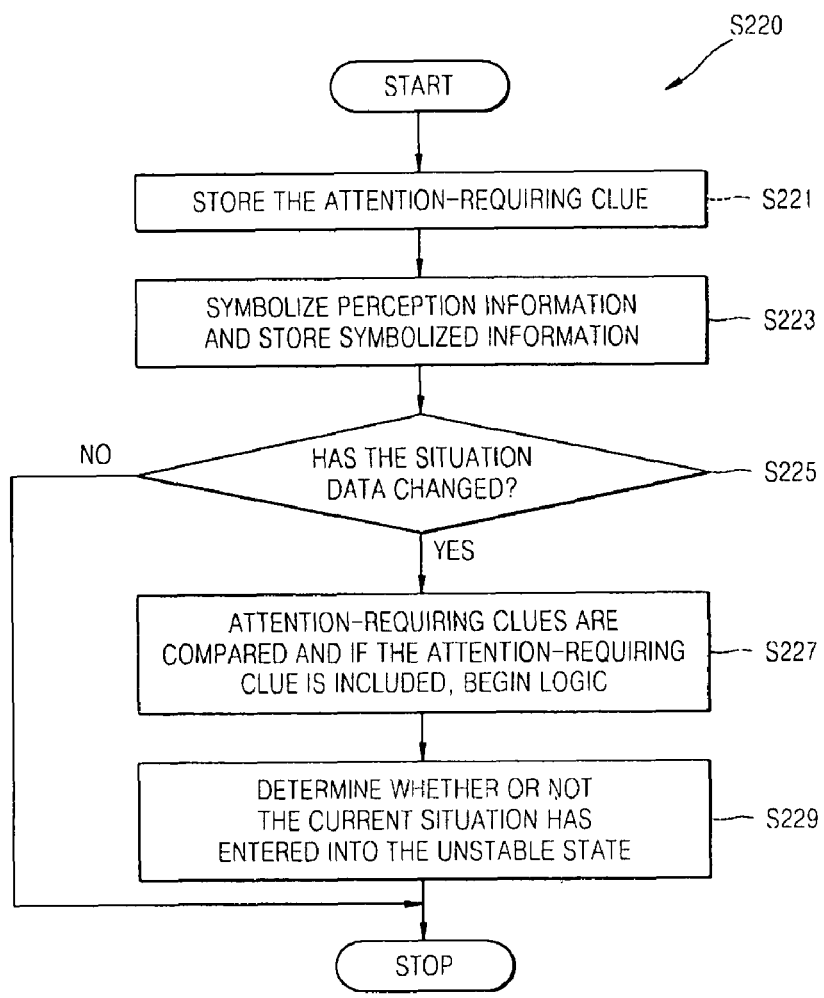
FIG. 3 is a detailed flowchart illustrating an operation for determining an unstable state of the method illustrated in FIG. 2 according to an embodiment of the present invention.
Figure 4:
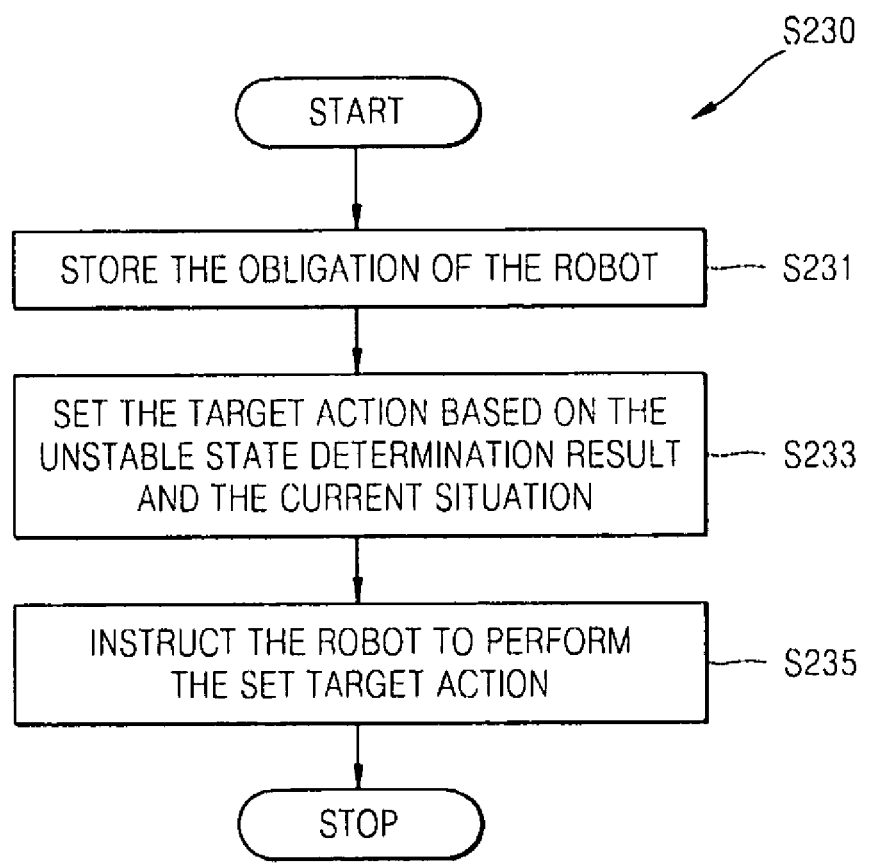
FIG. 4 is a detailed flowchart illustrating an operation for ordering a target action of a robot of the method illustrated in FIG. 2 according to an embodiment of the present invention.

The present invention will now be described more fully with reference to the accompanying drawings, in which exemplary embodiments of the invention are shown. For the convenience of explaining and to easily understand, an apparatus and a method for controlling a robot according to an embodiment of the present invention will be explained together. FIG. 1 is a block diagram illustrating a structure of an apparatus for controlling a robot according to an embodiment of the present invention. FIG. 2 is a flowchart illustrating a method of controlling a robot according to an embodiment of the present invention. FIG. 3 is a detailed flowchart illustrating an operation S220 for determining an unstable state of the method illustrated in FIG. 2 according to an embodiment of the present invention. FIG. 4 is a detailed flowchart illustrating an operation S230 for ordering a target action of a robot of the method illustrated in FIG. 2 according to an embodiment of the present invention.

The apparatus for controlling a robot according to an embodiment of the present invention is composed of a state interpretation unit 110 and a target generation unit 120. The state interpretation unit 110 determines whether or not a current situation belongs to a preset unstable state by evaluating the current situation based on an established performance obligation in operation S210 with at least one or more perception information items input externally in operation S220.

The target generation unit 120 sets a target action of the robot by comparing the current situation and the result of the determination of whether the current situation belongs to the preset unstable state as determined by the state interpretation unit 110 with a predetermined value system, and orders the target action in operation S230. Then, by receiving feedback on the result of performing the action by the robot as perception information, the target generation unit 120 modifies an action so that the result of the action becomes a target value in operation S240.

First, detailed blocks of the state interpretation unit 110 and the target generation unit 120 will be explained and then, the apparatus for controlling a robot will be explained in more details.

The state interpretation unit 110 is composed of an attention list unit 111 storing symbols that can be criteria to determine the unstable state, as attention-requiring clues; a situation interpretation unit 113 symbolizing the perception information items with symbols corresponding to the items, respectively, and outputting the symbols; a situation unit 115 storing the symbolized perception information items; a situation monitor 117 confirming whether or not the attention-requiring clues exist by searching through the situation unit 115 whenever the contents of the situation unit 115 change, and if the attention-requiring clues exist, outputting a driving signal ordering start of logic; and an unstable state interpretation unit 119 determining whether or not a current state has entered into an unstable state, by performing logic based on a predetermined rule according to the driving signal.

Meanwhile, the target generation unit 120 is composed of a value system unit 121 storing obligations that the robot must perform; a target setting unit 123 receiving inputs of the determination result of the state interpretation unit 110 and a current situation, accessing the value system unit 121 in order to compare the inputs of the determination result with the obligations, and then, setting a target action that the robot must perform; and an action selection unit 125 outputting an action guide to the robot so as to perform the set target action.

Detailed operations of the apparatus for controlling a robot will now be explained in detailed under the structure described above. First, the attention list unit 111 stores clue information with which an occurrence of a situation that the robot should pay attention to can be found in operation S221. The state interpretation unit 110 receives inputs of a variety of perception information items from an external perception devices (not shown), including a variety of sensors, cameras, and a voice recognition apparatus. Perception information items are input to the situation interpretation unit 113, and the situation interpretation unit 113 interprets and symbolizes each perception information item or combines many perception information items and symbolizes the combined items so that a situation description can be generated in operation S223. Thus generated situation description data is recorded in the situation unit 115.

Part of the situation description data recorded in the situation unit 115 is re-input to the situation interpretation unit 113 and undergoes a process of modification or deletion in order to maintain consistency of the contents of the situation description data recorded in the situation unit 115. Since the situation unit 115 continuously receives situation description data that is generated as a result of an interpretation of a situation, the contents of the situation unit 115 continuously change. The situation monitor 117 continuously monitors the changed contents of the situation unit 115. If data stored in the attention list unit 111 appears in the situation unit 115, the situation monitor 117 informs the unstable state situation interpretation unit 119 of this fact. The unstable state interpretation unit 119 determines whether or not an unstable state has occurred by collectively considering special attention clues transferred by the situation monitor 117 and the contents of the situation unit 115 in operations S225 and S227. If it is determined that an unstable state has occurred, the unstable state interpretation unit 119 transfers the occurred unstable state to the target generation unit 120 in operation S229. The target setting unit 123 of the target generation unit 120 collectively evaluates the unstable state of the unstable state interpretation unit 119 and the contents of the situation unit 115, determines which target action is to be set for a user by comparing the unstable state of the unstable state interpretation unit 119 and the contents of the situation unit 115 with the value system unit 111, and transfers the set target action to the action selection unit 125. The action selection unit 125 selects an action that can achieve the set target action in operations S231 and S233.

An external action embodiment and implementation device, for example, a robot, which receives the thus selected action, determines how to perform the selected action and actually performs the selected action. The performance result is again input to the state interpretation unit 110 as perception information. If the performance result is successful, it is interpreted and determined that the set target has been achieved. If the performance result is not successful, the set target has not been achieved and therefore, a new target is set through the procedure described above or the action that is required to achieve the target is stopped.

In the performing of the functions as described above, data exchanged between elements performing the respective functions is data described in a knowledge representation language, and based on this, each element performs a series of logical functions such that required determination functions can be performed. Also, the value system unit 111 is a knowledge based unit describing obligatory items and task items that should be performed by the robot, and is a set of data promoting safety of the actions of the robot and setting basic aims of the actions of the robot.

Hereinafter, an embodiment of the present invention will be explained with a more specific example. The present embodiment of the present invention applies to a robot that actively provides a pleasant indoor environment to a user by monitoring and interpreting the situation of the indoor environment.

Figure 5:
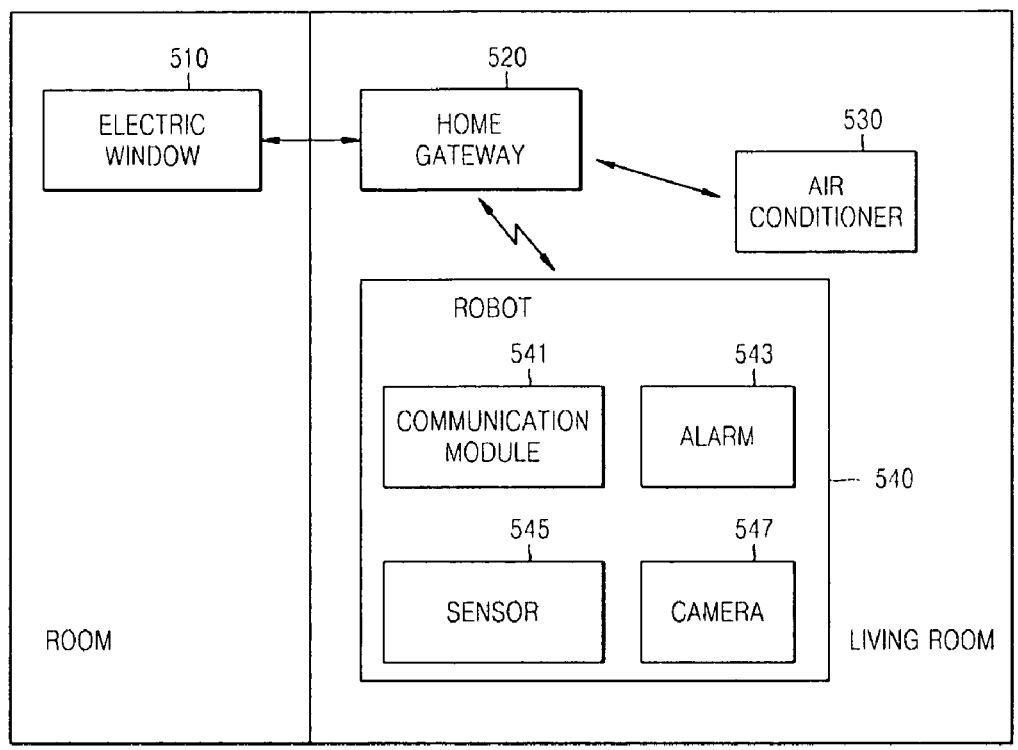
FIG. 5 is schematic diagram illustrating an apparatus for controlling a robot actually interoperating with other devices according to an embodiment of the present invention.

First, the structure of the robot will now be explained briefly. The robot of the present embodiment and the structure of an environment for the operation of the robot are illustrated in FIG. 5. FIG. 5 is schematic diagram illustrating an apparatus for controlling a robot that is actually interoperating with other devices according to an embodiment of the present invention.

A robot apparatus 540 is composed of a driving unit (not shown), a sensor 545 measuring temperature and humidity, a camera 547, an alarm 543, and a communication module 541. The communication module 541 wirelessly performs communication functions with a home gateway 520. The home gateway 520 performs a control center function controlling an air conditioner 530 and an electric window 510 having remote control functions. The robot apparatus 540 transfers a function request to the home gateway 520 so that the devices are controlled.

Next, an active robot control apparatus and method according to an embodiment of the present invention will be explained together. The sensor 545 of the robot apparatus 540, which measures temperature and humidity, is attached to the robot apparatus 540 to continuously sense temperature and humidity data of a space where the robot apparatus 540 is positioned and transfers the data to the situation interpretation unit 113. The situation interpretation unit 113 symbolizes a situation by using a predetermined rule. For example, if the temperature is 25 degrees or greater, a symbol corresponding to "hot" is generated, and if the temperature is 10 degrees or lower, a symbol corresponding to "cool" is generated. Also, the camera 547 of the robot apparatus 540 continuously shoots images in a predetermined manner and transfers the images to the situation interpretation unit 113. At the same time, though not shown, recognition results by a variety of external recognition devices are also transferred too the situation interpretation unit 113. For example, a predetermined user is recognized through image recognition, an identification (ID) of the recognized user is transferred to the situation interpretation unit 113. By using the transferred ID, the situation interpretation unit 113 records in the situation unit 115 a symbol indicating which user the robot apparatus 540 is confronted by. The following table 1 describes the contents of data recorded in the situation unit 115 at an arbitrary time:

TABLE 1

| | |
|---|---|
| LocatedAt(Me,101) | //I (robot) is positioned at a place 101. |
| LocatedAt(Cheolsu,101) | //A user with an ID, Cheolsu, is in the place 101. |
| Confronted(Cheolsu,2005-10-23T10:20:30) | //I (robot) is confronted by a user with an ID, Cheolsu. |
| Temperature(101,28) | //Temperature of the place 101 is 28 degrees. |
| Humidity(101,80) | //Humidity of the place 101 is 80%. |
| Hot(101) | //the place 101 is hot. |
| VeryHumid(101) | //the place101 is very humid. |

A robot manufacturer or a user registers a symbol, such as Hot or VeryHumid, which becomes a clue of an unstable state of an environment in the attention list unit 111. Since a service for a user may be needed when the robot apparatus 540 confronts the user, a symbol, such as Confronted, is also registered in the attention list unit 111.

The situation monitor 117 determines whether or not a special attention clue exists by monitoring the contents of the situation unit 115 in order to determine whether the contents of the situation unit 115 have changed. If the contents of the situation unit 115 correspond to the example described above, the situation monitor 117 drives the unstable state interpretation unit 119 with Hot and VeryHumid as clues. The unstable state interpretation unit 119 determines whether or not an unstable state has occurred by collectively analyzing the current contents of the situation unit 115. By performing logic based on the following rules, the unstable state interpretation unit 119 determines whether or not an unstable state has occurred.

R10: Hot(?loc) and VeryHumid(?loc) and LocatedAt(?someone,?loc) and ~CaughtCold(?someone)→Instability(HotAndHumid,Uncomfortable,?someone,?loc)

R11: TooNoisy(?loc) and LocatedAt(?someone,?loc) and ~PlayingMedia(?someone,?loc)→Instability(Noisy, Uncomfortable,?someone,?loc)

Rule R10 determines that an area is unstable because the area is hot and humid if an area is hot and humid and if a person is in the area. According to this rule, if nobody is in the hot and humid area, it is determined that an unstable state has not occurred. Also, rule R10 includes a condition described as, (~CaughtCold(?someone)), where the state is not regarded as an unstable state if the user in the area has caught a cold. This is because if the user has caught a cold, a boiler may be intentionally set to a high temperature and a humidifier may be turned on.

Rule R11 means that if a user is in a predetermined area that is very noisy and the user has not turned on a movie or music media player, the state is regarded as an unstable state.

The unstable state interpretation unit 119 transfers a sensed unstable state to the target generation unit 120 so that a target action of the robot apparatus 540 can be generated. The target setting unit 123 generates a target by gathering the occurred unstable state, preset data of the value system unit 121, and other situations of the situation unit 115. Initially, the value system unit 121 includes the following knowledge:

R20: User(?someone)–>OughtToMake(?someone, Comfortable)

R21: User(?someone)–>OughtToBeTo(?someone, Polite)

R22: Uncomfortable=~Comfortable

R23: Impolite=~Polite

Rule R20 can be interpreted as a task item where a user is serviced to feel comfortable, and rule R21 can be interpreted as a task item where the robot apparatus 540 acts politely to the user. Logical expressions R22 and R23 indicate that the both concepts of each expression are contradictory. This value system of the robot apparatus 540, that is explained above, becomes clue information to verify whether or not an occurred unstable state prevents the robot apparatus 540 from performing a task, and explains which action should be drawn with which intention.

The target setting unit 123 determines an occurrence of an inconsistency in the value system of the robot apparatus 540, and which target action should be set in order to solve the inconsistency, according to the following rules:

R30: OughtToMake(?someone,?x) and Instability(?cause,?y,?someone,?loc) and ?x=~?y→Resolve(?cause,?someone,?loc)

R31: Resolve(?cause,?someone,?loc) and Resolvent(?cause,?goal)→Goal(?goal,?someone,?loc)

R32: Resolvent(HotAndHumid, CoolAndDry)

Rule R30 indicates that when a task is assigned through a value system and the task cannot be completed because of an unstable state (as described by ?x=~?y), the causal element must be solved. Rule R31 is applied to find a clue to solve the causal element and to set a target action in order to perform the solution. Rule R32 describes as a fact that a basic solution to HotAndHumid is CoolAndDry. Accordingly, considering the data flow up to this point, the target setting unit 123 will set a target action as per the following:
Goal(CoolAndDry,Cheolsu, 101)

That is, the target action means that, "Area 101 should be made to be cool and dry for a user with an ID of Cheolsu".

Finally, the action selection unit 125 sets a means to achieve CoolAndDry as the target action. The action selection unit 125 utilizes the following information:

R40: Action(OpenWindow, WindowClosed, ClearWether, CoolAndDry)
R41: Action(TurnOnAirconditioner, WindowClosed, DoorClosed, CoolAndDry)
R42: Goal(?resolvent, ?someone, ?loc) and Action(?action, ?precondition1, ?precondition2, ?resolvent) and ?precondition1(?loc) and ?precondition2(?loc)→Perform(?action, ?loc)

Rules R40 and R41 indicate means to achieve specific target actions. Initially, rule R40 indicates an action of opening a window, and indicates a prerequisite where the window is closed and the weather is sunny. Also, the result of the action is CoolAndDry. Next, rule R41 suggests an action of turning on the air conditioner 530, and indicates a prerequisite where the window and a door are closed.

Rule R42 determines an action to be performed by collectively considering a target action, means to achieve the target action, and a current state. If the window and door are closed and the weather is cloudy, the action that is to be selected will be an action to turn on the air conditioner. However, if the window and door are closed and the weather is sunny, both rules R40 and R41 are satisfied and a contradiction occurs. In the case of a contradiction, a priority between actions is set as the following so that a policy for selecting an action is followed and the contradiction can be solved.

R40: Action(OpenWindow, WindowClosed, ClearWether, CoolAndDry)
R41: Action(TurnOnAirconditioner, WindowClosed, DoorClosed, CoolAndDry)
R42: Superior(OpenWindow, TurnOnAirconditioner)
R43: Goal(?resolvent, ?someone, ?loc) and Action(?action, ?precondition1, ?precondition2, ?resolvent) and ?precondition1(?loc) and ?precondition2(?loc)→TemporaryPerform(?action, ?loc)
R44: TemporaryPerform (?action1, ?loc) and TemporaryPerform (?action2, ?loc) and Superior(?action1, ?action2)→Perform(?action1,?loc)

Rule R42 declares that opening the window is an action having priority over an action of turning on the air conditioner. Also, rule R43 performs an intermediate decision instead of determining a final action. When a plurality of actions are selected, rules R44 determines a final result by selecting an action with a higher priority from among the plurality of actions.

Thus, the determined final action is transferred to an action embodiment and implementation device, for example, a robot, and an actual physical service is performed. For example, as illustrated in FIG. 5, if an action of opening the window is drawn because the user is in the room and the room is hot and humid, the robot apparatus 540 instructs the home gateway 520 to open the electric window 510 of the room through the communication module 541, and according to the instruction, the electric window 510 is opened.

It should be noted that, by storing the contents of knowledge processing of the processing process as described above, the robot apparatus 540 can inform the intention of performing the action to the user. That is, in the above example, the robot apparatus 540 can answer "The window is opened to make Cheolsu feels comfortable". That is, because the contradiction occurred in the part of the value system where there was a lack of comfort. Also, in relation to why it was determined that Cheolsu feels uncomfortable, the robot apparatus 540 can answer, "because the room is hot and humid."

In the method of actively controlling a robot according to the present invention as described above, the intention to maintain the environment of the user to be safe and pleasant is continuously input into a robot apparatus and the robot is compelled to act according to the intention such that the robot apparatus can be actively controlled.

Also, the robot apparatus can be made to be able to explain the reason why an action by the robot is performed based on a value system.

The present invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but, by the appended claims, and all differences within the scope will be construed as being included in the present invention.

According to the apparatus and method of controlling a robot of the present invention as described above, by inputting a processing procedure and a value system to solve a variety of unstable states that can occur in situations of a user and circumstances surrounding the robot, the robot can actively respond with corresponding actions.

As a result, the robot can actively keep the user in a safe situation and solve the instability of the environment, and the robot manufacturer or the user can easily assign or set the robot apparatus with tasks, obligations, and etiquette.

Also, the robot apparatus can be made to be able to explain the background and the process of an action performed by the robot apparatus.

Furthermore, in relation to making a robot apparatus perform more active and intelligent actions, by making the robot apparatus able to think in a manner similar to that of a human being, user friendliness and safety of the robot apparatus can be improved. As a result, this improvement can be a driving force for the robot industry in terms of personal and home use.

What is claimed is:

1. An apparatus for controlling a robot, the apparatus comprising:
    a processor and a memory, the memory having stored thereon:

a state interpretation unit determining a result on whether or not a current situation belongs to a preset unstable state, wherein the determined result is based on evaluating the current situation after receiving a plurality of perception information items input externally, wherein the state interpretation unit determines whether or not the current state has entered into an unstable state by performing logic based on a predetermined rule according to a driving signal; and a target generation unit is configured to set a target action for achieving an action performance result of the robot by comparing both of the current situation and the determined result with a predetermined value system, and then, modifying the target action by receiving a feedback of the action performance result of the robot as a next perception information item, wherein the feedback of the action performance result of the robot is used as one of a plurality of next perception information items input externally as a next current situation to determine if the set target action has been achieved, wherein the determining if the set target action has been achieved is by having the state interpretation unit determine a next result by determining whether at least one of the entered unstable state remains and whether the next result has entered into a new unstable state, and wherein at least one of the entered unstable state and the entered new unstable state are configured to be used as inputs to set a new target action or to stop the set target action.

2. The apparatus of claim 1, wherein data described in knowledge representative language is transmitted and received between the state interpretation unit and the target generation unit.

3. The apparatus of claim 1, wherein the state interpretation unit comprises:

an attention list unit storing symbols that are criteria in order to determine the preset unstable state as attention-requiring clues;

a situation interpretation unit symbolizing the perception information items with symbols corresponding to the items, respectively, and outputting the symbols;

a situation unit storing the symbolized perception information items;

a situation monitor confirming whether or not the attention-requiring clues exist by searching the situation unit whenever the contents of the situation unit change, and if the attention-requiring clues exist, outputting the driving signal ordering a start of logic; and an unstable state interpretation unit determining whether or not the current state has entered into the unstable state by performing the logic based on the predetermined rule according to the driving signal of the situation monitor.

4. The apparatus of claim 1, wherein the target generation unit comprises:

a value system unit storing obligations that the robot must perform;

a target setting unit receiving inputs of the determined result of the state interpretation unit and a current situation, accessing the predetermined value system in order to compare the inputs of the determined result of the state interpretation unit with the obligations of the predetermined value system unit, and then, setting a target action that the robot must perform; and an action selection unit outputting an action guide to the robot so as to perform the set target action.

5. A method of controlling a robot, the method comprising:

providing a processor and a memory, the memory having stored thereon:

establishing a plurality of obligations that a robot must perform;

determining a result on whether or not a current situation belongs to a preset unstable state by evaluating the current situation after receiving a plurality of perception information items input externally, wherein the determining whether or not the current state has entered into an unstable state is by performing logic based on a predetermined rule according to a driving signal;

setting a target action for achieving an action performance result of the robot by comparing both of the current situation with the determined result with the obligations, and then, ordering the performance of the target action; and modifying the target action by receiving a feedback of the action performance result of the robot as a next perception information item, wherein the feedback of the action performance result of the robot is used as one of a plurality of next perception information items input externally as a next current situation to determine if the performance of the target action has been achieved, wherein the determining if the performance of the target action has been achieved is by determining a next result by determining whether at least one of an entered unstable state remains and whether the next result has entered into a new unstable state, and wherein at least one of the entered unstable state and the entered new unstable state are configured to be used as inputs to order a new performance of a target action or to stop the performance of the target action.

6. The method of claim 5, wherein the determining of whether or not a current situation belongs to a preset unstable state comprises:

storing symbols that are criteria in order to determine the preset unstable state as attention-requiring clues;

symbolizing the perception information items with symbols corresponding to the items, respectively, and storing the symbols as situation data;

comparing situation data with the attention-requiring clues whenever the situation data changes and if the situation data includes the attention-requiring clues by outputting the driving signal for starting logic; and determining whether or not the current state enters into the unstable state by performing the logic based on the predetermined rule.

7. The method of claim 5, wherein the setting of the target action of the robot and the ordering of the performance of the action comprises:

storing obligations that the robot must perform;

comparing both of the determination result of an unstable state and the current situation with the obligations, and then, setting the target action that the robot must perform; and outputting an action guide to the robot so that the robot performs the set target action.

8. The method of claim 7, wherein in the storing of the obligations that the robot must perform, the obligations are stored in the form of knowledge.

9. A computer readable recording non-transitory medium having embodied thereon a computer program for executing the method of controlling a robot, wherein the method comprises:

storing a plurality of obligations that a robot must perform;

determining a result whether or not a current situation belongs to a preset unstable state by evaluating the current situation after receiving a plurality of perception information items input externally, wherein the determining whether or not the current state has entered into an unstable state is by performing logic based on a predetermined rule according to a driving signal;

setting a target action for achieving an action performance result of the robot by comparing both of the current situation and the determined result with the obligations, and then, ordering a performance of the action; and modifying the target action by receiving a feedback of the action performance result of the robot as a next perception information item, wherein the feedback of the action performance result of the robot is used as one of a plurality of next perception information items input externally as a next current situation to determine if the performance of the target action has been achieved, wherein the determining if the performance of the target action has been achieved is by determining a next result by determining whether at least one of an entered unstable state remains and whether the next result has entered into a new unstable state, and wherein at least one of the entered unstable state and the entered new unstable state are configured to be used as inputs to order a new performance of a target action or to stop the performance of the target action.

* * * * *